US007805895B2

(12) United States Patent
Kristensen

(10) Patent No.: US 7,805,895 B2
(45) Date of Patent: Oct. 5, 2010

(54) FOUNDATION FOR ENABLING ANCHORING OF A WIND TURBINE TOWER THERETO BY MEANS OF REPLACEABLE THROUGH-BOLTS

(75) Inventor: Jonas Kristensen, Skjern (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/638,260

(22) Filed: Dec. 15, 2009

(65) Prior Publication Data

US 2010/0146890 A1    Jun. 17, 2010

Related U.S. Application Data

(60) Provisional application No. 61/122,782, filed on Dec. 16, 2008.

(30) Foreign Application Priority Data

Dec. 16, 2008    (DK)    ............................... 2008 01792

(51) Int. Cl.
E02D 27/00    (2006.01)
(52) U.S. Cl. ........................ 52/169.9; 52/169.6; 52/297; 52/745.17; 52/223.4; 52/295
(58) Field of Classification Search .................... 52/40, 52/169.6, 169.7, 296, 297, 745.17, 745.19, 52/849, 223.4, 223.5, 20, 21, 196.13, 295; 416/DIG. 6, 146 R; 415/121.3
See application file for complete search history.

(56) References Cited

U.S. PATENT DOCUMENTS

| 795,984 | A | * | 8/1905 | Julian | ........................ | 454/183 |
|---|---|---|---|---|---|---|
| 3,164,111 | A | * | 1/1965 | Lanni | ........................ | 109/1 S |
| RE26,995 | E | * | 12/1970 | Guggemos | ................ | 52/122.1 |
| 3,653,169 | A | * | 4/1972 | Jenner | ........................ | 52/298 |
| 3,858,998 | A | * | 1/1975 | Larsson et al. | ................ | 404/26 |
| 3,988,870 | A | * | 11/1976 | Snavely | ........................ | 52/296 |
| 4,272,929 | A | * | 6/1981 | Hanson | ........................ | 52/40 |
| 4,327,703 | A | * | 5/1982 | Destree | ........................ | 125/1 |
| 4,406,094 | A | * | 9/1983 | Hempel et al. | ................ | 52/40 |
| 4,642,952 | A | * | 2/1987 | Prandin | ..................... | 52/169.6 |

(Continued)

FOREIGN PATENT DOCUMENTS

WO        2005/015013        2/2005

OTHER PUBLICATIONS

Jan Sørensen; Office Action and Search Report issued in related Denmark Application No. PA 2008 01792; Jul. 31, 2009; 4 page; Denmark Patent and Trademark Office.

*Primary Examiner*—Robert J Canfield
*Assistant Examiner*—Matthew J. Gitlin
(74) *Attorney, Agent, or Firm*—Wood, Herron & Evans, L.L.P.

(57)    ABSTRACT

A foundation for enabling anchoring of a wind turbine tower thereto by means of replaceable through-bolts includes a foundation sole with a set of through-holes for accommodating the through-bolts, wherein the through-holes extend from an upper surface to a lower surface of the foundation sole; a workspace arranged beneath the foundation sole for enabling access to lower ends the through-bolts when arranged in the through-holes; and a passage allowing access to the workspace from a location outside an area of the foundation sole to be covered by the tower. A method for providing such a foundation is also disclosed.

9 Claims, 3 Drawing Sheets

U.S. PATENT DOCUMENTS

| | | | |
|---|---|---|---|
| 4,925,337 A * | 5/1990 | Spiess et al. | 404/26 |
| 5,678,382 A * | 10/1997 | Naito | 52/745.21 |
| 5,826,387 A * | 10/1998 | Henderson et al. | 52/295 |
| 5,966,882 A * | 10/1999 | Naito | 52/295 |
| 6,335,709 B1 * | 1/2002 | Cummings | 343/890 |
| 6,371,688 B1 * | 4/2002 | Yang et al. | 404/26 |
| 6,385,913 B1 * | 5/2002 | Ahn | 52/20 |
| 6,385,920 B1 * | 5/2002 | Chandler | 52/169.6 |
| 6,401,411 B1 * | 6/2002 | Maglio, Jr. | 52/297 |
| 6,438,907 B1 * | 8/2002 | McCarthy | 52/169.6 |
| 6,448,668 B1 | 9/2002 | Robitaille | |
| 6,651,391 B2 * | 11/2003 | Nale | 52/20 |
| 6,672,023 B2 * | 1/2004 | Henderson | 52/296 |
| 6,702,522 B2 * | 3/2004 | Silber | 405/229 |
| 6,953,302 B1 * | 10/2005 | Kochling | 404/26 |
| 7,025,529 B2 * | 4/2006 | Boudreau | 404/26 |
| 7,155,875 B2 * | 1/2007 | Henderson | 52/741.15 |
| 7,374,369 B2 * | 5/2008 | Jakubowski et al. | 405/244 |
| 7,533,505 B2 * | 5/2009 | Henderson | 52/292 |
| 7,618,217 B2 * | 11/2009 | Henderson | 405/255 |
| 2002/0092262 A1 * | 7/2002 | Schlusselbauer | 52/745.19 |
| 2002/0124502 A1 * | 9/2002 | Henderson | 52/296 |
| 2002/0194794 A1 * | 12/2002 | Hill et al. | 52/40 |
| 2003/0233806 A1 * | 12/2003 | Kuebler et al. | 52/726.4 |
| 2004/0098935 A1 * | 5/2004 | Henderson | 52/296 |
| 2005/0183364 A1 * | 8/2005 | Cash | 52/296 |
| 2007/0251187 A1 | 11/2007 | Schiffer et al. | |
| 2008/0155907 A1 * | 7/2008 | Wobben | 52/169.13 |
| 2008/0302038 A1 * | 12/2008 | Wobben | 52/296 |
| 2009/0064604 A1 * | 3/2009 | Yamaguchi | 52/169.6 |
| 2009/0223139 A1 * | 9/2009 | Meiners | 52/40 |

* cited by examiner

FOUNDATION FOR ENABLING ANCHORING OF A WIND TURBINE TOWER THERETO BY MEANS OF REPLACEABLE THROUGH-BOLTS

CROSS REFERENCE TO RELATED APPLICATIONS

This application claims priority under 35 U.S.C. §119(a) to DK Application No. PA 2008 01792, filed Dec. 16, 2008. This application also claims the benefit of U.S. Provisional Application No. 61/122,782, filed Dec. 16, 2008. Each of these applications is incorporated by reference herein in its entirety.

TECHNICAL FIELD

The present invention generally relates to a wind turbine foundation.

In particular, the present invention relates to a foundation for enabling anchoring of a wind turbine tower thereto by means of replaceable through-bolts, and a method for providing such a foundation.

BACKGROUND

A wind turbine typically comprises a rotor provided with a set of blades, wherein the rotor is arranged on top of a wind turbine tower anchored to a foundation embedded in the ground. Typically, the tower is made of steel, whereas the foundation is made of reinforced concrete. In order to anchor the steel tower to the concrete foundation, a flange with through-holes is provided at the bottom of the steel tower. Anchor bolts, embedded in the concrete foundation and protruding from the surface thereof, may then be introduced into the through-holes in the flange so that the flange may be fastened with nuts.

An alternative to using bolts embedded in the concrete is to utilize replaceable through-bolts which are arranged in through-holes in the concrete foundation.

An example of such an arrangement is found in US2007/0251187, which discloses a wind turbine foundation with an internal workspace for allowing inspection and maintenance of the through-bolts and the nuts securing the through-bolts to the foundation. The foundation according to US2007/0251187 includes an entrance which provides access to the workspace from the interior of the tower.

Although enabling inspection of the through-bolts, there appears to be room for improvement with regards to the structural strength of the foundation disclosed in US2007/0251187.

SUMMARY

In view of the above, embodiments in accordance with aspects of the invention provide an improved wind turbine foundation capable of improved structural strength, that enables a wind turbine tower to be anchored by means of replaceable through-bolts.

According to one aspect, an embodiment of the invention provides a foundation for enabling anchoring of a wind turbine tower thereto by means of replaceable through-bolts, the foundation comprising: a foundation sole with a set of through-holes for accommodating the through-bolts, wherein the through-holes extend from an upper surface to a lower surface of the foundation sole; a workspace arranged beneath the foundation sole for enabling access to lower ends of the through-bolts when arranged in the through-holes; and a passage allowing access to the workspace from a location outside an area of the foundation sole to be covered by the tower.

By workspace is meant a cavity that is sufficiently large for a worker to access the lower ends of the through-bolts.

Embodiments in accordance with aspects of the invention are based on the understanding that an efficient way to improve the structural strength of the foundation is to structurally separate the workspace from the foundation sole. The inventor has further realized that this can be achieved by providing a passage allowing access to the workspace from a location outside an area of the foundation sole to be covered by the tower.

In the foundation according to the prior art, a relatively large man-hole is provided in the center of the foundation. As a result, the bolts are fastened relatively close to an (interior) edge of the foundation. To achieve the required structural strength to enable secure anchoring of a wind turbine, it is expected that considerable effort will have to be spent on the reinforcement of the foundation in the vicinity of the through-holes.

By instead providing a passage allowing access to the workspace from a location outside the area of the foundation sole to be covered by the tower, the through-holes can be arranged in a substantially continuous block of concrete, which can inherently be made considerably stronger where it matters the most, namely, where the through-holes are provided. Additionally, the reinforcement configuration can be made simpler, which reduces the time needed to build the foundation.

Furthermore, a less complex formwork can be used when forming the foundation sole, thereby facilitating construction and reducing costs.

The workspace may be defined by at least one prefabricated shell structure. An advantage is that pre-fabrication typically is more cost-efficient than production in situ. Furthermore, the workload at the wind turbine construction site is reduced, thereby shortening construction time. To facilitate transportation to the wind turbine construction site, the workspace may be provided as two or more prefabricated shell structures and assembled at the wind turbine construction site.

The foundation may also comprise a load distributing member arranged at the lower surface of the foundation sole for distributing any stress generated at the lower ends of the through-bolts over a larger area of the foundation sole. The load distributing member may, for example, be a steel plate provided with a set of through-holes for receiving the through-bolts. The shape of the load distributing member may be, for example, circular or ring-shaped.

The load distributing member may be an integral part of the at least one pre-fabricated shell structure, thereby reducing the number of components as well as the workload at the wind turbine construction site. Thus, the load distributing member may at least partly be integrated in the ceiling of the workspace.

The foundation may also comprise a set of hollow tubes extending from the lower surface to the upper surface of the foundation sole thereby defining the through-holes in the foundation sole. The tubes, which are configured to accommodate the through-bolts, thus separate the through-bolts from the concrete in the foundation sole so that the through-bolts can be removed from the through-holes, e.g., for inspection and/or replacement.

According to an alternative embodiment, each through-bolt may be provided with a coating and then be embedded in the foundation sole. The coating may thus prevent concrete from adhering to the through-bolt, thereby enabling a replaceable through-bolt.

The tubes can optionally be arranged on the load distributing member in such a way that a bore of each tube coincides with a through-hole in the load distributing member (e.g., by attaching the lower end of the tube to the load distributing member). An advantage is that the tubes are fixed relative one another thereby reducing the risk that the tubes are displaced during embedment in the foundation sole. If the load distributing member is an integral part of the pre-fabricated shell structure, the tubes will also be fixed in relation to the workspace.

There is also provided a wind turbine arrangement comprising a foundation according to various embodiments of the present invention; and a wind turbine tower anchored to the foundation by means of replaceable through-bolts.

According to another embodiment in accordance with aspects of the invention, there is provided a method for providing a foundation for enabling anchoring of a wind turbine tower thereto by means of replaceable through-bolts, the method comprising the steps of: providing a foundation sole having a set of through-holes for accommodating the through-bolts, wherein the through-holes extend from an upper surface to a lower surface of the foundation sole; providing a workspace beneath the foundation sole; and providing a passage allowing access to the workspace from a location outside an area of the foundation sole to be covered by the tower.

This aspect exhibits similar advantages as the previously discussed aspect of the invention.

The step of providing a workspace may comprise the steps of providing at least one pre-fabricated shell structure defining the work space. The foundation sole may then be formed above the pre-fabricated shell structure in situ.

As an alternative, the work space and/or the passage may be formed through excavation when the foundation sole is in place.

The step of providing a foundation sole may comprise the step of providing a set of hollow tubes defining the through-holes; and embedding the tubes in the foundation sole. Embedding here means that the outside of the tubes are embedded in concrete whereas there is no concrete in the bore of the tube.

The step of providing a set of hollow tubes may comprise the steps of attaching the tubes to a load distributing member, and arranging the load distributing member above the workspace. According to an embodiment, this can be achieved by arranging the load distributing member to be an integral part of the pre-fabricated shell structure.

There is also provided a method for anchoring a wind turbine, comprising the step of anchoring a wind turbine tower to the foundation according to various embodiments of the present invention by means of replaceable through-bolts.

Other objectives, features and advantages of embodiments in accordance with the invention will appear from the following detailed disclosure, from the attached claims, as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages will be better understood through the following illustrative and non-limiting detailed description of example embodiments, and with reference to the appended drawings, where the same reference numerals will be used for similar elements, wherein.

DETAILED DESCRIPTION

Figure 1:
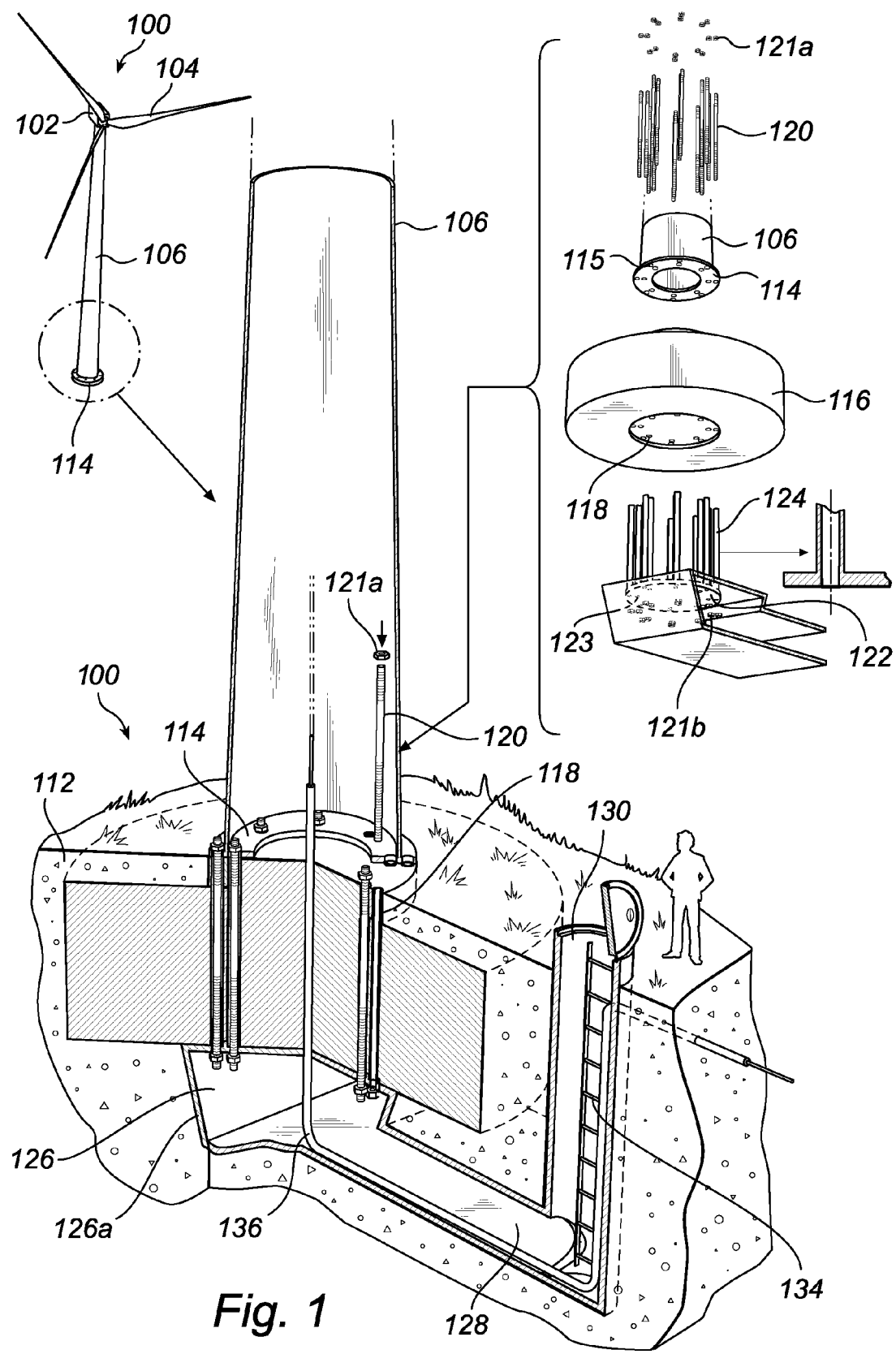
FIG. 1 schematically illustrates a wind turbine foundation according to a first embodiment of the invention.

FIG. 1 schematically illustrates a wind turbine foundation according to a first embodiment of the invention.

Referring to FIG. 1, there is a wind turbine 100 comprising a rotor 102 provided with a set of blades 104. The rotor 102 is arranged on top of a tower 106 which is anchored to a foundation sole 116, which is here shown to be embedded in the ground 112.

The tower 106 is typically made of steel, whereas the foundation sole 116 is made of reinforced concrete. In order to anchor the steel tower 106 to the foundation sole 116, a flange 114 with through-holes 115 is provided at the bottom of the steel tower. Furthermore, the foundation sole 116 is provided with a corresponding set of through-holes 118. Thus, the tower can be anchored to the foundation sole 116 by arranging the tower on the upper surface of the foundation sole 116, aligning the through-holes 115 in the flange with the through-holes 118 in the foundation sole 116, inserting through-bolts 120 in the aligned holes, and fastening nuts 121a, b at the upper and lower ends of each through-bolt (i.e., for each through-bolt one nut 121a is arranged on the upper side of the flange 115, and one nut 121b is arranged at the lower side of the foundation sole 116). A load distributing member 122 arranged at a lower surface of the foundation sole distributes the stress generated by the nuts 121b over a larger area of the foundation sole. A workspace 126, which can be accessed via a passage 128, enables a worker to fasten the nut 121b at the lower end of each through-bolt 120, as well as post-tensioning, inspection of through-bolts and/or, if needed removal of a nut to enable exchange of a through-bolt.

Furthermore, a cable 136 for transferring power generated by the wind turbine can be arranged in the passage and workspace. Thus, a small hole (typically having a diameter about 110 mm) is provided in the foundation sole. However, such a small hole will not influence the structural strength of the foundation sole.

Figure 2:
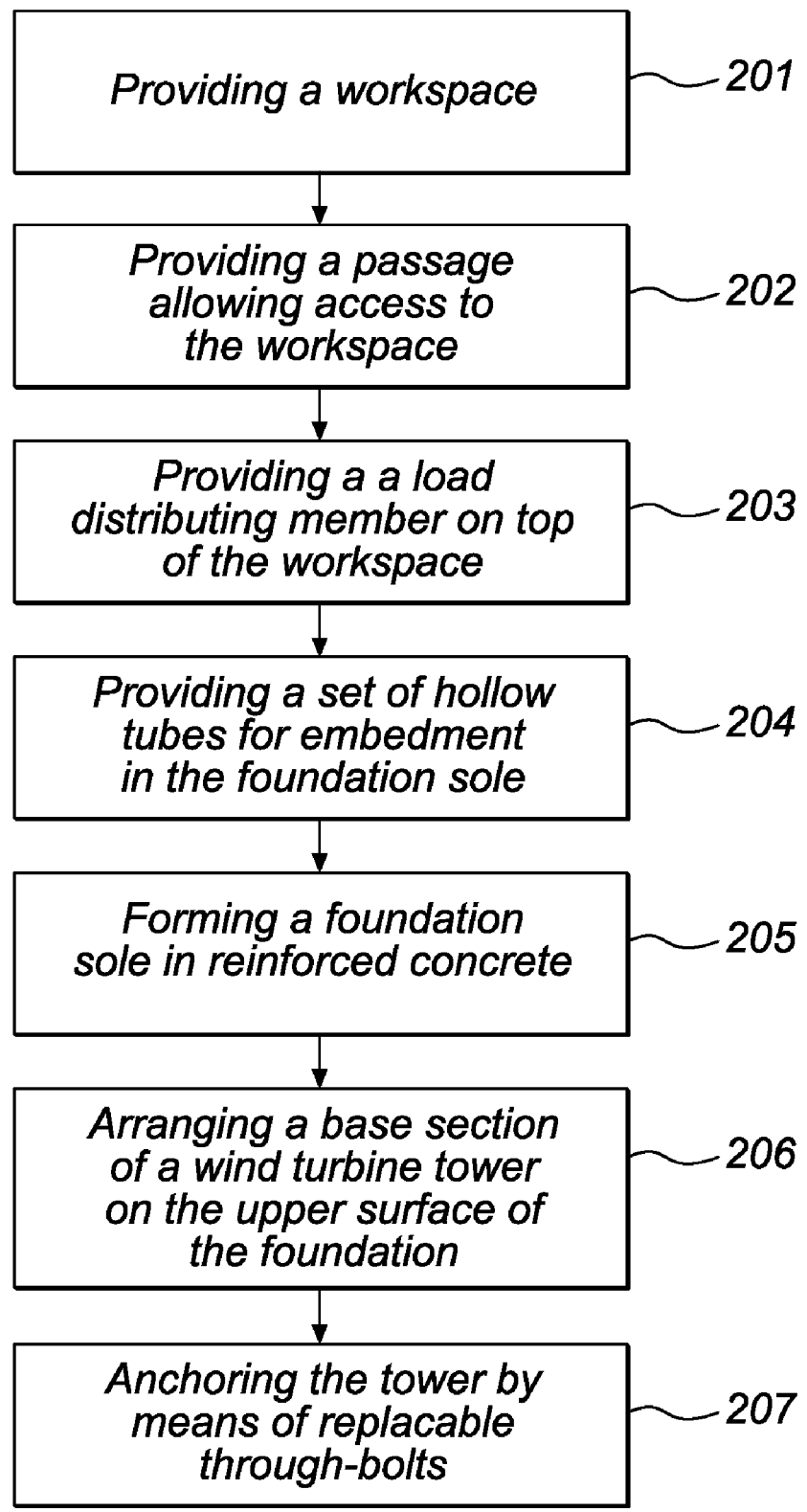
FIG. 2 is a flow-chart schematically illustrating a method for providing a foundation according to an embodiment of the invention.

FIG. 2 is a schematic block diagram of a method for providing a foundation according to a preferred embodiment of the present invention.

A method for providing a foundation according to an embodiment of the present invention will now be described with reference to FIGS. 1 and 2.

First, in step 201, a workspace 126 is formed in an excavation in the ground. The workspace 126 is here a cavity defined by a shell structure 126a made of concrete. However, other materials can also be used such as, for example, steel or plastics.

Although the shell structure 126a can be manufactured in situ, it may often be preferable to utilize a pre-fabricated shell structure. In order to facilitate transportation, the workspace can be built up by more than one shell structure and assembled at the wind turbine construction site.

In step 202, a passage 128 is connected to the workspace, to allow a worker to enter the workspace. The passage 128 is here a conventional culvert with an associated manhole 130 located next to the foundation sole 116. A ladder 134 can be provided to facilitate entry and exit.

It is recognized by a person skilled in the art that the shape and size of the passage 128 and workspace 126 may vary depending on the application. However, the passage 128 and workspace 126 should be dimensioned sufficiently large for a worker to enter the workspace 126 and access the lower end of the through-bolts 120, e.g., to allow fastening of a nut 121b, post-tensioning, inspection of through-bolts and/or, if needed, removal of a nut to enable exchange of a through-bolt.

Since most of the force exerted by the wind turbine tower 106 is absorbed by the foundation sole 116, the requirements for structural strength is relatively low for the workspace shell structure 126a. However, as concrete typically is poured on top of the shell structure 126a to form the foundation sole, the shell structure must be able to support the weight of this concrete until the foundation sole has cured. It is recognized that the thickness of the shell structure may vary (e.g., due to the design of the shell structure and the material used therein) and is a matter of routine dimensioning for a person skilled in the art.

In step 203, a load distributing member 122 is provided above the workspace. The load distributing member is here a circular steel plate 122 having a set of through-holes 123 configured to receive the through-bolts. The load distributing member is here an integral part of the workspace shell structure 126a as the steel plate is integrated in the ceiling of the workspace. The load distributing member could also form a complete ceiling of the shell structure or a smaller portion thereof (e.g., by using a ring-shaped load distributing member). The load distributing member could also be provided separately from the shell structure.

In step 204, a set of hollow tubes 124 is provided for embedment in the foundation sole. Here the tubes 124 are vertically arranged on the load distributing member 122 extending upwards therefrom. The tubes are arranged such that the bore of each tube 124 coincides with one of the through-holes 123 in the load distributing member. The tubes 124 may, for example, be steel tubes welded to the steel plate 122.

However, other materials may also be used for the tubes, such as, for example, plastic.

Moreover, the tubes may be attached to a structure other than the load distributing member or be provided separately.

In step 205, a foundation sole 116 is formed according to well-known techniques for reinforced concrete construction. This may typically include, constructing a formwork that defines the shape of the foundation sole; arranging reinforcement bars therein for enhanced structural strength of the foundation sole; and pouring concrete into the formwork. As concrete is poured into the formwork, the outside of the tubes 124 will be embedded in concrete (but there will be no concrete inside the tubes).

Since the tubes 124 are fixedly attached to the load distributing member 122, any relative displacement of the tubes when concrete is poured into the formwork is prevented.

In step 206, a base section of a wind turbine tower is arranged on the upper surface of the foundation sole 116.

Here, a T-shaped steel flange 114 is provided at the bottom of the base section. The steel flange 114 has a set of through-holes 115, here comprising an inner set of through-holes and an outer set of through-holes located on the inner and outer side of the tower wall, respectively. The through-holes 115 in the steel flange 114 corresponds to the through-holes 118 in the foundation sole 116. Thus, as the steel flange 114 is arranged on the upper surface of the foundation sole 116, the holes 115 in the steel flange 114 are aligned to corresponding holes 118 in the foundation sole 116.

In step 207, a set of through-going bolts 120 are arranged in the aligned holes and a first nut 121a is fastened at the upper end of each through-bolt 120 (i.e., above the steel flange 114), and a second nut 121b is fastened at the lower end of each through-bolt 120 (i.e., below the load distributing member), thereby anchoring the tower 106 to the foundation sole 116. Since the load distributing member 122 is arranged between the nuts 121b at the lower ends of the through-bolts and the foundation sole 116, the load distributing member 122 distributes the stress generated by the nuts 121b over a larger area of the foundation sole 116.

As the tubes 124 separate the through-bolts 120 from the concrete in the foundation sole 116, it becomes possible to remove the through-bolts by loosening the lower nuts.

Figure 3:
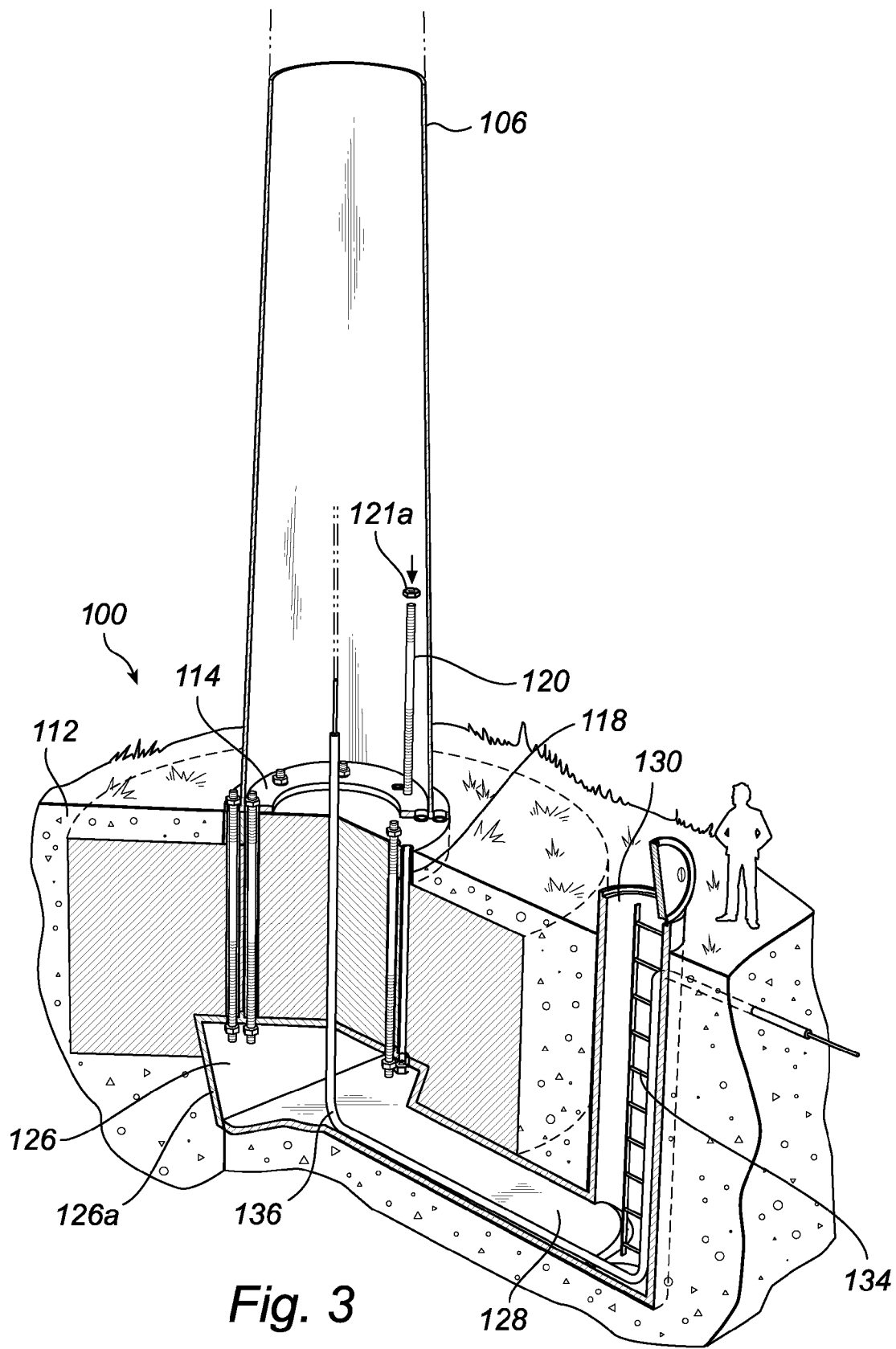
FIG. 3 illustrates a second embodiment of a foundation sole.
Figure 2:
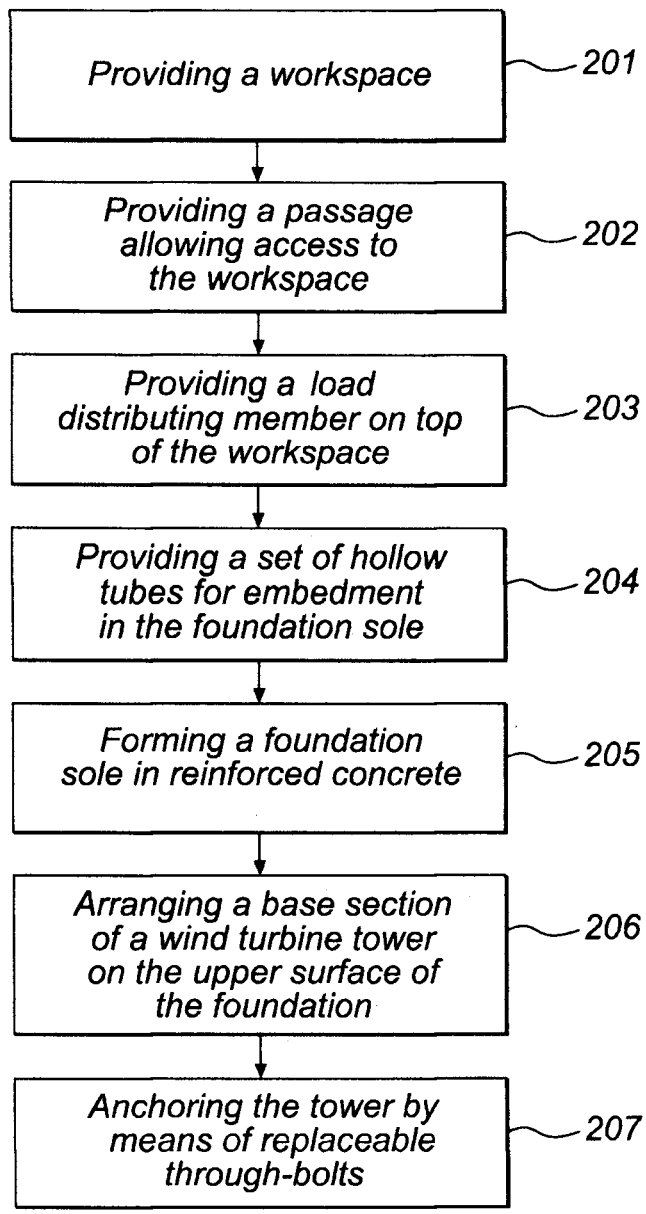

It is recognized by a person skilled in the art that the shape of the foundation sole may vary. For example, instead of having a flat bottom surface, the foundation sole may enclose the upper portion of the workspace as illustrated in FIG. 3.

The invention has mainly been described above with reference to a few embodiments. However, as is readily appreciated by a person skilled in the art, other embodiments than the ones disclosed above are equally possible within the scope of the invention, as defined by the appended claims. For example, a screw with a nut at the lower end may be utilized instead of a through-bolt having nuts at both ends. Further, instead of providing a single plate that works as a load distributing member for all through-bolts in the foundation sole, a plurality of load distributing members may be utilized. Although the foundation sole in the illustrated examples is embedded in the ground, the foundation sole may alternatively be partially embedded in the ground or may be provided on top of the ground.

What is claimed is:

1. A foundation for enabling anchoring of a wind turbine tower thereto by means of replaceable through-bolts, comprising:
    a foundation sole including a set of through-holes for accommodating the through-bolts, wherein said through-holes extend from an upper surface to a lower surface of said foundation sole;
    a set of hollow tubes extending from the lower surface to the upper surface of said foundation sole thereby defining said through-holes in said foundation sole;
    a load distributing member arranged at a lower surface of said foundation sole for distributing stress generated at the lower ends of the through-bolts over a larger area of said foundation sole, said tubes arranged on said load distributing member in such a way that a bore of each tube coincides with a through-hole in said load distributing member;
    a workspace arranged beneath said foundation sole for enabling access to lower ends of the through-bolts when arranged in said through-holes; and
    a passage which does not pass through said foundation sole allowing access to said workspace from a location outside an area of the foundation sole to be covered by the tower.

2. The foundation according to claim 1, wherein said workspace is defined by at least one prefabricated shell structure.

3. The foundation according to claim 1, wherein said workspace is defined by at least one prefabricated shell structure and said load distributing member is an integral part of said at least one pre-fabricated shell structure.

4. A wind turbine arrangement, comprising:
a wind turbine tower;
replaceable through-bolts; and
a foundation, comprising:
  a foundation sole including a set of through-holes for accommodating said through-bolts, wherein said through-holes extend from an upper surface to a lower surface of said foundation sole;
  a set of hollow tubes extending from the lower surface to the upper surface of said foundation sole thereby defining said through-holes in said foundation sole;
  a load distributing member arranged at a lower surface of said foundation sole for distributing stress generated at the lower ends of the through-bolts over a larger area of said foundation sole, said tubes arranged on said load distributing member in such a way that a bore of each tube coincides with a through-hole in said load distributing member;
  a workspace arranged beneath said foundation sole for enabling access to lower ends of said through-bolts when arranged in said through-holes; and
  a passage which does not pass through said foundation sole allowing access to said workspace from a location outside an area of said foundation sole to be covered by said tower;
  wherein said wind turbine tower is anchored to said foundation by means of said replaceable through-bolts.

5. A method for providing a foundation for enabling anchoring of a wind turbine tower thereto by means of replaceable through-bolts, comprising:
  providing a foundation sole having a set of through-holes for accommodating the through-bolts, wherein the through-holes extend from an upper surface to a lower surface of the foundation sole, a set of hollow tubes extending from the lower surface to the upper surface thereby defining the through-holes, and a load distributing member arranged at the lower surface for distributing stress generated by the through-bolts over a larger area of the foundation sole, the tubes arranged on the load distributing member in such a way that a bore of each tube coincides with a through-hole in the load distributing member;
  providing a workspace beneath the foundation sole; and
  providing a passage which does not pass through the foundation sole allowing access to the workspace from a location outside an area of the foundation sole to be covered by the tower.

6. The method according to claim 5, wherein providing a workspace further comprises providing at least one pre-fabricated shell structure defining the workspace.

7. The method according to claim 5, further comprising:
embedding the tubes in the foundation sole.

8. The method according to claim 5, further comprising:
attaching the tubes to the load distributing member; and
arranging the load distributing member above the workspace.

9. A method of anchoring a wind turbine, comprising:
providing a foundation having a foundation sole with a set of through-holes extending from an upper surface to a lower surface of the foundation sole, a set of hollow tubes extending from the lower surface to the upper surface thereby defining the through-holes, a load distributing member arranged at the lower surface for distributing stress generated by the through-bolts over a larger area of the foundation sole, the tubes arranged on the load distributing member in such a way that a bore of each tube coincides with a through-hole in the load distributing member, a workspace arranged beneath the foundation sole, and a passage which does not pass through the foundation sole allowing access to the workspace; and
anchoring a wind turbine tower to the foundation by means of replaceable through-bolts, wherein the set of through-holes accommodate the through-bolts, the workspace enables access to lower ends of the through-bolts when the through-bolts are arranged in the through-holes, and the passage allows access to the workspace from a location outside an area of the foundation sole covered by the wind turbine tower.

* * * * *

UNITED STATES PATENT AND TRADEMARK OFFICE
CERTIFICATE OF CORRECTION

PATENT NO. : 7,805,895 B2
APPLICATION NO. : 12/638260
DATED : October 5, 2010
INVENTOR(S) : Jonas Kristensen It is certified that error appears in the above-identified patent and that said Letters Patent is hereby corrected as shown below:

Drawings
Delete Fig. 2 and substitute therefor the drawing sheet, consisting of Fig. 2 as shown on the attached page.

Column 5
Line approx. 20-21 "... the requirements for ... is relatively low ..." should read
--... the requirement for ... is relatively low ...--

Column 6
Line 5-6 "... through-holes 115 in ... corresponds to ..." should read
--... through-holes 115 in ... correspond to ...--

Signed and Sealed this
Twenty-ninth Day of March, 2011

David J. Kappos
*Director of the United States Patent and Trademark Office*